(12) United States Patent
Song et al.

(10) Patent No.: US 11,362,588 B2
(45) Date of Patent: Jun. 14, 2022

(54) POWER CONVERSION CIRCUIT AND RELATED APPARATUS AND TERMINAL DEVICE

(71) Applicant: Huawei Technologies Co., Ltd., Shenzhen (CN)

(72) Inventors: Jun Song, Xi'an (CN); Pengfei Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 16/697,992

(22) Filed: Nov. 27, 2019

(65) Prior Publication Data

US 2020/0099298 A1 Mar. 26, 2020

Related U.S. Application Data

(63) Continuation of application No. PCT/CN2018/088049, filed on May 23, 2018.

(30) Foreign Application Priority Data

Jun. 1, 2017 (CN) .......................... 201710404467.6

(51) Int. Cl.
*H02M 3/158* (2006.01)
*H02M 1/14* (2006.01)

(52) U.S. Cl.
CPC ............. *H02M 3/158* (2013.01); *H02M 1/14* (2013.01)

(58) Field of Classification Search
CPC ... H02M 3/158; H02M 1/14; H02M 3/07–078
See application file for complete search history.

(56) References Cited

U.S. PATENT DOCUMENTS

| 8,339,110 | B2 | 12/2012 | Jordan |
| 8,854,019 | B1 | 10/2014 | Levesque et al. |
| 2009/0115388 | A1 | 5/2009 | Miyazaki et al. |
| 2010/0026271 | A1 | 2/2010 | Ouyang |
| 2013/0038305 | A1* | 2/2013 | Arno ....................... H02M 3/07 323/282 |

(Continued)

FOREIGN PATENT DOCUMENTS

| CN | 101414790 A | 4/2009 |
| CN | 101640478 A | 2/2010 |

(Continued)

*Primary Examiner* — Rafael O De Leon Domenech
(74) *Attorney, Agent, or Firm* — Conley Rose, P.C.

(57) ABSTRACT

A power conversion circuit includes a first switch branch, a second switch branch, a third switch branch, a filter branch, and a first capacitor. A first terminal of the first capacitor is connected to a power source through the first switch branch, and a second terminal of the first capacitor is grounded through the second switch branch. The filter branch includes a filter inductor and a filter capacitor. A first terminal of the filter inductor is connected to the first terminal of the first capacitor, and a second terminal of the filter inductor is connected to a first terminal of the filter capacitor. A second terminal of the filter capacitor is grounded, and the filter capacitor is connected in parallel with the load. The third switch branch is connected between the second terminal of the first capacitor and the second terminal of the filter inductor.

15 Claims, 5 Drawing Sheets

(56) References Cited

U.S. PATENT DOCUMENTS

2016/0190932 A1    6/2016  Yu et al.
2017/0179819 A1*  6/2017  Notoya .................. H02M 3/07
2019/0372462 A1   12/2019  Song et al.

FOREIGN PATENT DOCUMENTS

| CN | 102075083 A | 5/2011 |
| CN | 103066841 A | 4/2013 |
| CN | 105763048 A | 7/2016 |
| CN | 106685219 A | 5/2017 |
| KR | 101441454 B1 | 11/2014 |

\* cited by examiner

POWER CONVERSION CIRCUIT AND RELATED APPARATUS AND TERMINAL DEVICE

CROSS-REFERENCE TO RELATED APPLICATIONS

This application is a continuation application of International Application No. PCT/CN2018/088049, filed on May 23, 2018, which claims priority to Chinese Patent Application No. 201710404467.6, filed on Jun. 1, 2017. The disclosures of the aforementioned applications are hereby incorporated by reference in their entireties.

TECHNICAL FIELD

The present disclosure relates to the field of electronic technologies, and in particular, to a power conversion circuit and a related apparatus and terminal device.

BACKGROUND

In recent years, lithium batteries have been widely used because of their high energy density, safety, and reliability. As the storage capacity of lithium batteries increases year by year, rapid and efficient charging of lithium batteries has become a hot topic of research.

A part of core importance in a battery charging system is a power conversion circuit. This circuit functions to transfer energy from a high voltage power source to a battery in a step-down manner, according to a need of the battery. When energy is transferred to the battery, there is an energy loss, and the lost energy is converted into heat to heat up the charging system. In order to reduce the energy loss, it is necessary to improve conversion efficiency of the power conversion circuit.

Figure 1:
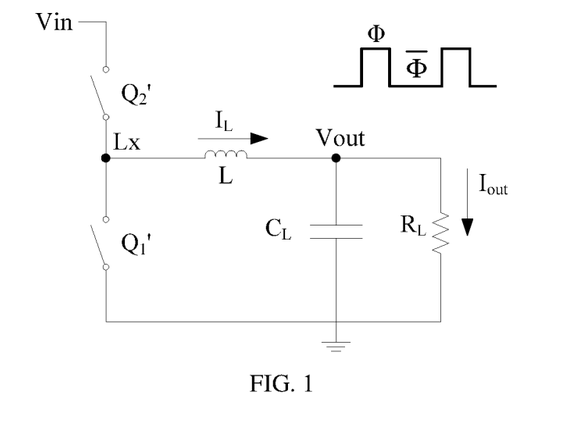
FIG. 1 is a schematic structural diagram of a power conversion circuit in other approaches.

FIG. 1 is a schematic structural diagram of an existing mainstream power conversion circuit. The power conversion circuit shown in FIG. 1 includes two power transistor switches $Q_1'$ and $Q_2'$, and peripheral elements which are a capacitor $C_L$ and an inductor L. In FIG. 1, $R_L$ is a load. A complete signal period includes two time intervals, such as $\Phi$ and $\bar{\Phi}$. In the time interval corresponding to $\Phi$, $Q_2'$ is closed, and $Q_1'$ is open. In the time interval corresponding to $\bar{\Phi}$, $Q_2'$ is open, and $Q_1'$ is closed. When the circuit shown in FIG. 1 becomes steady, $$Vout = Vin \times \left(\frac{\Phi}{\Phi + \bar{\Phi}}\right), \text{ and } I_L = I_{out}.$$

Key factors constraining the conversion efficiency of the power conversion circuit include a loss due to direct current resistance (DCR) and a loss due to parasitic capacitance at a switch node $L_X$. In one period, the DCR loss is $DCR \times I_L^2$, the parasitic capacitance at the switch node $L_X$ is $C_p$, and the loss due to the parasitic capacitance at the switch node $L_X$ is $$\frac{C_p * Vin^2}{2}.$$

It should be noted that, when the power conversion circuit shown in FIG. 1 becomes steady, because an inductor current $I_L$ is equal to a load current $I_{out}$, when the load current $I_{out}$ is deterministic, reducing the DCR loss can only be realized by reducing the DCR. However, due to physical processing limitations, reducing the DCR is relatively difficult, and reducing the DCR increases a price and a size of the inductor. In addition, to reduce the loss caused by the parasitic capacitance at $L_X$, the only way is to reduce $C_p$. However, reducing $C_p$ requires a smaller size of the power transistor switch, which increases internal resistance of the power transistor switch, and in turn increases a loss caused by the internal resistance of the power transistor switch. In this way, even if $C_p$ is reduced, the conversion efficiency of the power conversion circuit is possibly not improved eventually.

SUMMARY

Embodiments of this application provide a novel power conversion circuit, to improve conversion efficiency of a power conversion circuit.

According to a first aspect, an embodiment of this application provides a power conversion circuit configured to convert a power source to provide a working current to a load. The power conversion circuit includes a first switch branch, a second switch branch, a third switch branch, a filter branch, and a first capacitor, where a first terminal of the first capacitor is connected to the power source through the first switch branch; a second terminal of the first capacitor is grounded through the second switch branch; the filter branch includes a filter inductor and a filter capacitor that are connected in series; a first terminal of the filter inductor is connected to the first terminal of the first capacitor; a second terminal of the filter inductor is connected to a first terminal of the filter capacitor, and a second terminal of the filter capacitor is grounded; and the filter capacitor is connected in parallel with the load; and the third switch branch is connected between the second terminal of the first capacitor and the second terminal of the filter inductor.

Based on the foregoing technical solution, in the power conversion circuit described in the first aspect of this application, when the circuit becomes steady, a current in the filter inductor is reduced relative to a current in a filter inductor in a traditional power conversion circuit, and correspondingly, a loss due to direct current resistance corresponding to the filter inductor is reduced. In addition, a voltage amplitude at a junction of the first capacitor and the filter inductor is reduced relative to a voltage amplitude at the junction in the traditional power conversion circuit. Therefore, an energy loss corresponding to parasitic capacitance at the junction is reduced. Therefore, conversion efficiency of the power conversion circuit described in the first aspect of this application is improved.

In a possible implementation of the first aspect, the first switch branch includes a first switch; the third switch branch includes a third switch; and the second switch branch includes a second switch, where a first terminal of the second switch is connected to the second terminal of the first capacitor, and a second terminal of the second switch is grounded.

In another possible implementation of the first aspect, at least one of the switch of the switch branch connected in parallel with the first capacitor, the first switch, the second switch, and the third switch is a metal-oxide-semiconductor (MOS) transistor or a bipolar junction transistor (BJT) transistor.

In another possible implementation of the first aspect, the first switch branch includes a first switch, the third switch branch includes a third switch, and the second switch branch includes a second switch and i switching circuits, where a first terminal of the second switch is connected to the second terminal of the first capacitor, and a second terminal of the second switch is grounded through the i switching circuits, where i is an integer, and i≥1.

In another possible implementation of the first aspect, any switching circuit j of the i switching circuits includes a $(j+1)^{th}$ capacitor, a $(3\times(j+1))^{th}$ switch branch, a $(3\times(j+1)-1)^{th}$ switch branch, and a $(3\times(j+1)-2)^{th}$ switch branch, where j is an integer, and $1 \le j \le i$; a first terminal of an $(i+1)^{th}$ capacitor in an $i^{th}$ switching circuit is connected to the power source through a $(3\times(i+1)-2)^{th}$ switch branch; a second terminal of the $(i+1)^{th}$ capacitor is grounded through a $(3\times(i+1)-1)^{th}$ switch branch; and the second terminal of the $(i+1)^{th}$ capacitor is connected to the second terminal of the filter inductor through a $(3\times(i+1))^{th}$ switch branch; when i=1, the second switch of the second switch branch is connected between a first terminal of the second capacitor and the second terminal of the first capacitor; when i>1, a first terminal of a $(k+1)^{th}$ capacitor in a $k^{th}$ switching circuit is connected to the power source through a $(3\times(k+1)-2)^{th}$ switch branch; a $(3\times(k+1)-1)^{th}$ switch branch is connected between a first terminal of a $(k+2)^{th}$ capacitor and a second terminal of a $(k+1)^{th}$ capacitor; and the second terminal of the $(k+1)^{th}$ capacitor is connected to the second terminal of the filter inductor through a $(3\times(k+1))^{th}$ switch branch; where k is an integer, and $1 \le k < i$.

In another possible implementation of the first aspect, the power conversion circuit further includes a switch branch connected between the first terminal of the first capacitor and the second terminal of the $(i+1)^{th}$ capacitor, where the switch branch includes a switch.

In another possible implementation of this first aspect, at least one of the switch of the switch branch connected between the first terminal of the first capacitor and the second terminal of the $(i+1)^{th}$ capacitor, the first switch, the second switch, and the third switch is a MOS transistor or a BJT transistor.

According to a second aspect, an embodiment of this application provides a conversion apparatus, including a power source, a control signal generation circuit, and a power conversion circuit. The power source provides low voltage working power to a load through the power conversion circuit. The control signal generation circuit is configured to provide a periodic control signal to the power conversion circuit, where the control signal is used to control a switch in the power conversion circuit to be closed or open.

The power conversion circuit is the power conversion circuit according to any one of the first aspect or the possible implementations of the first aspect.

Based on a same concept, for a problem-resolving principle and beneficial effects of the conversion apparatus, reference may be made to the first aspect and the possible implementations of the first aspect and the beneficial effects thereof. Details are not described herein again.

According to a third aspect, an embodiment of this application provides a terminal device, including a power source, a control signal generation circuit, a power conversion circuit, and a load.

The power source provides working power to the load through the power conversion circuit.

The control signal generation circuit is configured to provide a periodic control signal to the power conversion circuit, where the control signal is used to control a switch in the power conversion circuit to be closed or open.

The power conversion circuit is the power conversion circuit according to any one of the first aspect or the possible implementations of the first aspect.

Based on a same concept, for a problem-resolving principle and beneficial effects of the terminal device, reference may be made to the first aspect and the possible implementations of the first aspect and the beneficial effects thereof. Details are not described herein again.

DESCRIPTION OF EMBODIMENTS

Figure 2:
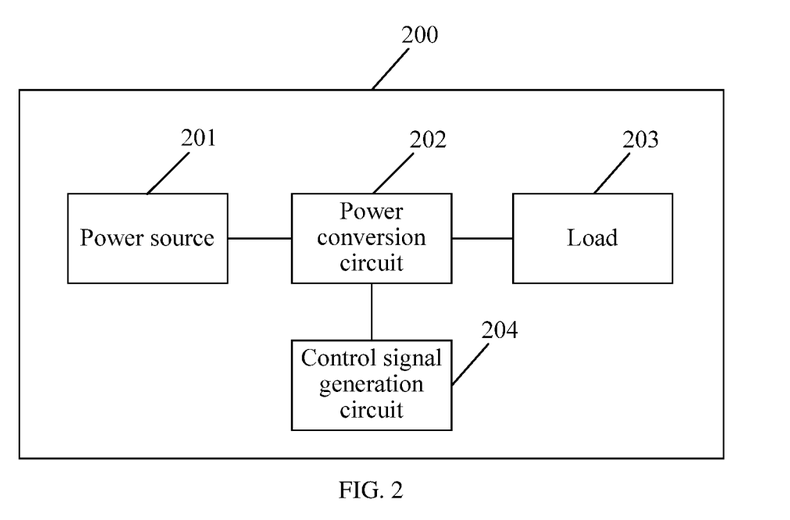
FIG. 2 is a schematic structural diagram of a terminal device having a power conversion circuit.

Refer to FIG. 2. FIG. 2 shows a terminal device 200 having a power conversion circuit 202. The terminal device 200 includes a power source 201, the power conversion circuit 202, a load 203, and a control signal generation circuit 204. In some possible implementations, the terminal device 200 may be a device such as a battery having a power conversion circuit, a cell phone using a battery, or an electric vehicle. The terminal device 200 may convert a high voltage of the power source 201 into low voltage power required by the load under an effect of the power conversion circuit 202 and the control signal generation circuit 204, to power the load.

Figure 3:
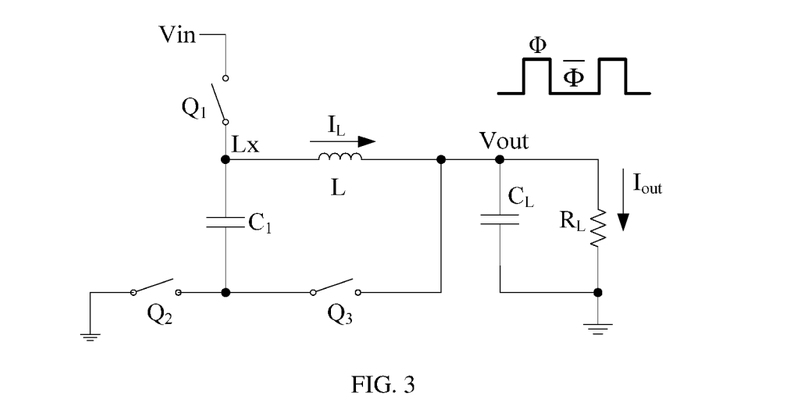
FIG. 3 is a schematic structural diagram of a power conversion circuit according to an embodiment of this application.

Refer to FIG. 3. FIG. 3 is a schematic structural diagram of a power conversion circuit according to an embodiment of this application. As shown in FIG. 3, the power conversion circuit is configured to convert a power source Vin to provide low voltage working power to a load $R_L$. The power conversion circuit includes a first switch branch, a second switch branch, a third switch branch, a filter branch, and a first capacitor $C_1$, where a first terminal of the first capacitor $C_1$ is connected to the power source through the first switch branch; a second terminal of the first capacitor $C_1$ is grounded through the second switch branch; the filter branch includes a filter inductor L and a filter capacitor $C_L$ connected in series, where a first terminal of the filter inductor L is connected to the first terminal of the first capacitor $C_1$, a second terminal of the filter inductor L is connected to a first terminal of the filter capacitor $C_L$, and a second terminal of the filter capacitor $C_L$ is grounded; and the filter capacitor $C_L$ is connected in parallel with the load $R_L$; and the third switch branch is connected between the second terminal of the first capacitor $C_1$ and the second terminal of the filter inductor L.

In some possible implementations of this application, the first switch branch includes a first switch $Q_1$; the third switch branch includes a third switch $Q_3$; and the second switch branch includes a second switch $Q_2$, where a first terminal of the second switch $Q_2$ is connected to the second terminal of the first capacitor, and a second terminal of the second switch $Q_2$ is grounded.

A complete signal period includes two time intervals such as $\Phi$ and $\overline{\Phi}$. In the time interval corresponding to $\Phi$, $Q_1$ and $Q_3$ are closed, and $Q_2$ is open. The power source Vin is connected to the first capacitor $C_1$, and then connected to Vout. The filter inductor L is connected to the power source Vin. At this time, the filter inductor L and the first capacitor $C_1$ are in a charging and energy accumulating state.

In the time interval corresponding to $\overline{\Phi}$, $Q_1$ and $Q_3$ are open, and $Q_2$ is closed. In this time interval, a bottom plate of the first capacitor $C_1$ is connected to a power ground through $Q_2$, and a voltage at a top plate is Vin–Vout. In this time interval, both the filter inductor L and the first capacitor $C_1$ are in a discharging state.

When the power conversion circuit becomes steady, $V_{C_1}$=Vin–Vout, $$Vout = \frac{V_{in}}{2-D}, \text{ and}$$

$$I_L = \frac{I_{out}}{2-D},$$

where $D = \frac{\Phi}{\Phi+\overline{\Phi}}$.

Therefore, the current $I_L$ in the filter inductor L is reduced to $$\frac{1}{2-D}$$

of the output current $I_{out}$, a loss due to DCR of the filter inductor is $$DCR \times \left(\frac{I_{out}}{2-D}\right)^2,$$

which is $$\left(\frac{1}{2-D}\right)^2$$

of a DCR loss in other approaches. In addition, a loss due to parasitic capacitance at a switch node $L_X$ in the power conversion circuit shown in FIG. 3 is considered. An amplitude of $V_{LX}$ in other approaches is Vin, and an amplitude of $V_{LX}$ in the power conversion circuit shown in FIG. 3 is Vout, where $$V_{out} = \frac{V_{in}}{2-D}.$$

Therefore, the power conversion circuit shown in FIG. 3 effectively reduces the loss due to the parasitic capacitance at the switch node $L_X$.

In summary, in the power conversion circuit shown in FIG. 3, when the circuit becomes steady, the current in the filter inductor is reduced relative to a current in a filter inductor in a traditional power conversion circuit, and correspondingly, a loss due to direct current resistance corresponding to the filter inductor is reduced. In addition, a voltage amplitude at a junction of the first capacitor and the filter inductor is reduced relative to a voltage amplitude at the junction in the traditional power conversion circuit. Therefore, an energy loss corresponding to the parasitic capacitance at the junction is reduced. Therefore, conversion efficiency of the power conversion circuit described in this embodiment is improved.

It should be noted that, in some possible implementations, at least one switch of the first switch $Q_1$, the second switch $Q_2$, and the third switch $Q_3$ is a MOS field-effect transistor and a BJT.

Figure 4:
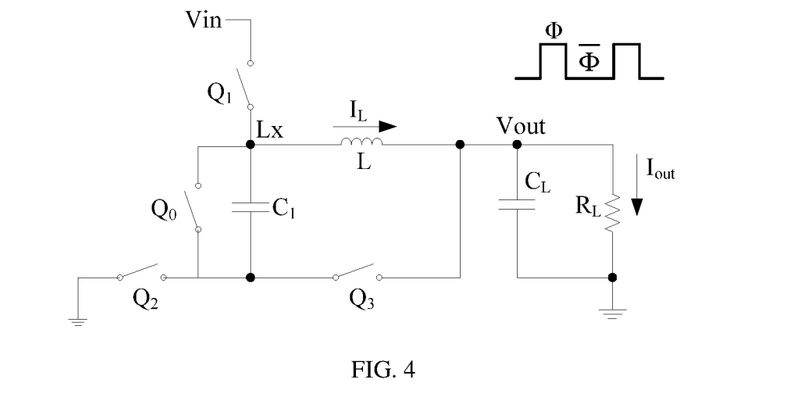
FIG. 4 is a schematic structural diagram of another power conversion circuit according to an embodiment of this application.

Refer to FIG. 4. FIG. 4 is a schematic structural diagram of another power conversion circuit according to an embodiment of this application. A difference from the power conversion circuit shown in FIG. 3 is addition of a switch branch connected in parallel with the first capacitor $C_1$, where the switch branch includes a switch $Q_0$. When the switch $Q_0$ is closed, the first capacitor $C_1$ is short-circuited.

A complete signal period includes two time intervals such as $\Phi$ and $\overline{\Phi}$. In the whole switching period, $Q_3$ is kept open, and $Q_0$ is kept closed. In addition, in the time interval corresponding to $\Phi$, $Q_1$ is closed, and $Q_2$ is open. At this time, the power source Vin is connected to the switch node $L_X$, and then connected to the filter inductor L in the power conversion circuit. At this time, the filter inductor L is in a charging and energy accumulating state. In the time interval corresponding to $\overline{\Phi}$, $Q_1$ is open, and $Q_2$ is closed. In this time interval, $Q_0$ and $Q_2$ are connected to the power ground through $L_X$, and the filter inductor L is in a discharging state.

When the power conversion circuit becomes steady, Vout=Vin×D, and $I_L$=$I_{out}$, where $$D = \frac{\Phi}{\Phi+\overline{\Phi}}.$$

Therefore, the loss due to the parasitic capacitance at $L_X$ is reduced, and the conversion efficiency of the power conversion circuit is improved.

In another working state, a complete signal period includes two time intervals such as $\Phi$ and $\overline{\Phi}$. In the whole switching period, $Q_0$ is open, and the first capacitor $C_1$ is in a working state.

In the time interval corresponding to $\Phi$, $Q_1$ and $Q_3$ are closed, and $Q_2$ is open. The power source Vin is connected to the top plate of the first capacitor $C_1$ (a first terminal of $C_1$), while the bottom plate of the first capacitor $C_1$ is connected to the Vout terminal (a second terminal of $C_1$) to provide an output current. At this time, the filter inductor L and the first capacitor $C_1$ are in a charging and energy accumulating state.

In the time interval corresponding to $\overline{\Phi}$, $Q_1$ and $Q_3$ are open, and $Q_2$ is closed. In this time interval, the bottom plate of the first capacitor $C_1$ is connected to the power ground through $Q_2$, and both the first capacitor $C_1$ and the filter inductor L are in a discharging state. When the power conversion circuit becomes steady, $V_{C_1}$=Vin–Vout, $$Vout = \frac{V_{in}}{2-D}, \text{ and}$$

$$I_L = \frac{I_{out}}{2-D},$$

where $D = \frac{\Phi}{\Phi + \overline{\Phi}}$.

Therefore, the current $I_L$ in the filter inductor L is reduced to $$\frac{1}{2-D}$$

of the output current $I_{out}$, a loss due to the DCR of the filter inductor is $$DCR \times \left(\frac{I_{out}}{2-D}\right)^2,$$

which is $$\left(\frac{1}{2-D}\right)^2$$

of the DCR loss in other approaches. In addition, a loss due to parasitic capacitance at the switch node $L_X$ in the power conversion circuit, $$\frac{C_p * V_{LX}^2}{2},$$

is considered. An amplitude of $V_{LX}$ in other approaches is Vin, and an amplitude of $V_{LX}$ in the power conversion circuit herein is Vout, where $$Vout = \frac{V_{in}}{2-D}.$$

Therefore, the power conversion circuit in this embodiment effectively reduces the loss due to the parasitic capacitance at the switch node $L_X$. In summary, the conversion efficiency of the power conversion circuit described in this embodiment is improved.

Figure 5:
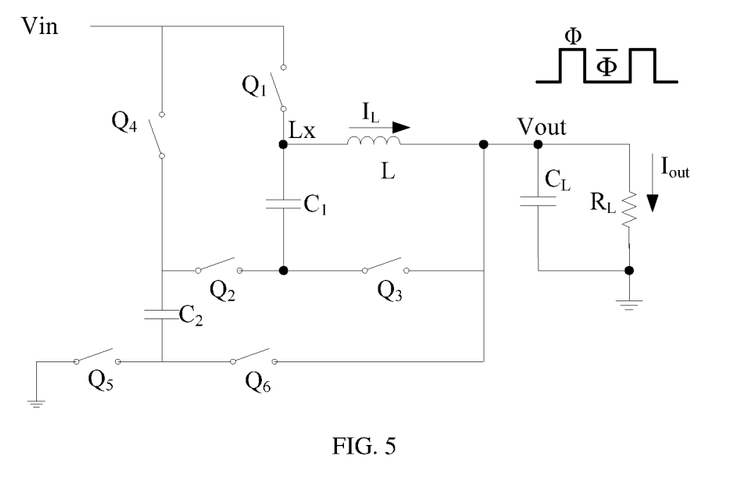
FIG. 5 is a schematic structural diagram of another power conversion circuit according to an embodiment of this application.

Refer to FIG. 5. FIG. 5 is a schematic structural diagram of another power conversion circuit according to an embodiment of this application. A difference from the power conversion circuit shown in FIG. 3 is that the second switch branch further includes one switching circuit in addition to the second switch. In particular, the first terminal of the second switch $Q_2$ is connected to the second terminal of the first capacitor $C_1$, and the second terminal of the second switch $Q_2$ is grounded through the switching circuit. The switching circuit includes a second capacitor $C_2$, a fourth switch branch including a fourth switch $Q_4$, a fifth switch branch including a fifth switch $Q_5$, and a sixth switch branch including a sixth switch $Q_6$. A first terminal of the second capacitor $C_2$ is connected to the power source Vin through $Q_4$, a second terminal of the second capacitor $C_2$ is grounded through $Q_5$, and the second terminal of the second capacitor $C_2$ is connected to a connector terminal of the filter inductor L and the filter capacitor $C_L$ through $Q_6$.

Figure 6:
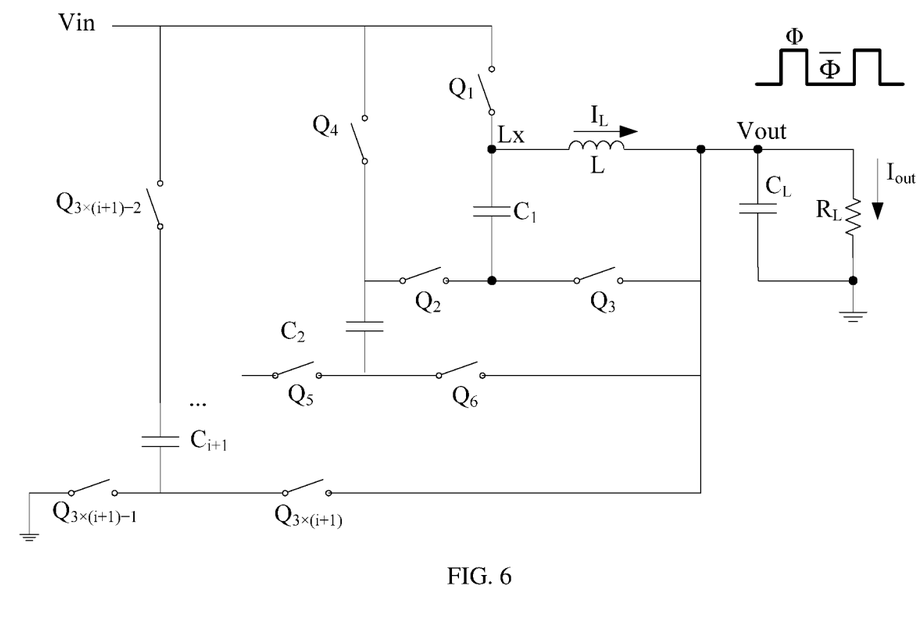
FIG. 6 is a schematic structural diagram of another power conversion circuit according to an embodiment of this application.

Further, the power conversion circuit may alternatively be that shown in FIG. 6, and a difference from the power conversion circuit shown in FIG. 5 is inclusion of i switching circuits, where i is an integer, and i≥1.

In particular, as shown in FIG. 6, any switching circuit j of the i switching circuits includes a $(j+1)^{th}$ capacitor, a $(3\times(j+1))^{th}$ switch branch, a $(3\times(j+1)-1)^{th}$ switch branch, and a $(3\times(j+1)-2)^{th}$ switch branch, where j is an integer, and 1≤j≤i. A first terminal of an $(i+1)^{th}$ capacitor in the $i^{th}$ switching circuit is connected to the power source through a $(3\times(i+1)-2)^{th}$ switch branch. A second terminal of the $(i+1)^{th}$ capacitor is grounded through a $(3\times(i+1)-1)^{th}$ switch branch. The second terminal of the $(i+1)^{th}$ capacitor is connected to the second terminal of the filter inductor through a $(3\times(i+1))^{th}$ switch branch.

When i=1, the second switch of the second switch branch is connected between a first terminal of the second capacitor and the second terminal of the first capacitor.

When i>1, a first terminal of a $(k+1)^{th}$ capacitor in a $k^{th}$ switching circuit is connected to the power source through a $(3\times(k+1)-2)^{th}$ switch branch; a $(3\times(k+1)-1)^{th}$ switch branch is connected between a first terminal of a $(k+2)^{th}$ capacitor and a second terminal of a $(k+1)^{th}$ capacitor; and the second terminal of the $(k+1)^{th}$ capacitor is connected to the second terminal of the filter inductor through a $(3\times(k+1))^{th}$ switch branch; where k is an integer, and 1≤k<i.

The $(3\times(j+1))^{th}$ switch circuit includes a $(3\times(j+1))^{th}$ switch $Q_{3\times(j+1)}$, the $(3\times(j+1)-1)^{th}$ switch branch includes a $(3\times(j+1)-1)^{th}$ switch $Q_{3\times(j+1)-1}$, and the $(3\times(j+1)-2)^{th}$ switch branch includes a $(3\times(j+1)-2)^{th}$ switch $Q_{3\times(j+1)-2}$.

Further, in some possible implementations of this application, the power conversion circuit further includes a switch branch connected between the first terminal $C_1$ of the first capacitor and the second terminal of the $(i+1)^{th}$ capacitor, where the switch branch includes a switch $Q_{3\times i+2}$.

In some possible implementations of this application, a switch of the switch branch connected between the first terminal of the first capacitor and the second terminal of the $(i+1)^{th}$ capacitor, the first switch, the second switch, and the third switch may be MOS transistors or BJT transistors.

Figure 7:
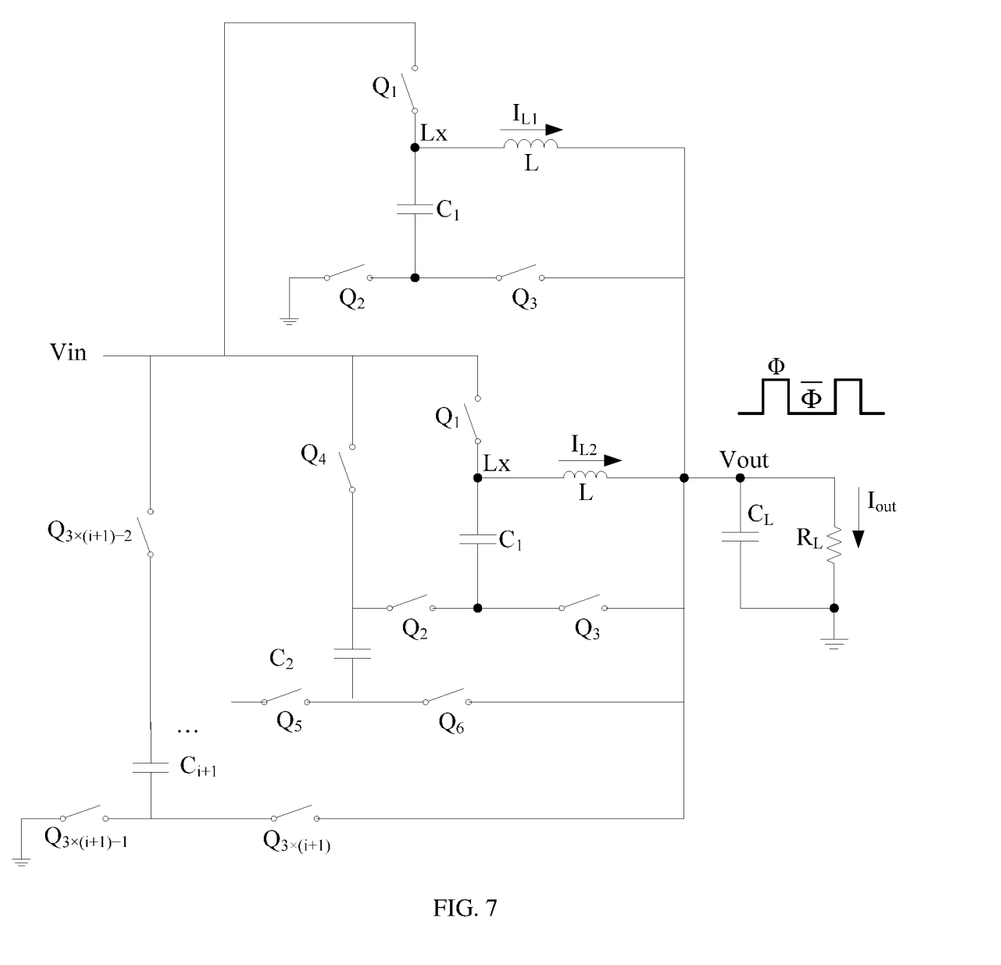
FIG. 7 is a schematic structural diagram of another power conversion circuit according to an embodiment of this application.

In some possible implementations of this application, the circuit connected between the power source Vin and the output voltage Vout may be a circuit in which the circuit connected between the power source Vin and the output voltage Vout in any embodiment described above are connected in parallel. In a power conversion circuit shown in FIG. 7, a circuit connected between a power source Vin and an output voltage Vout may be a circuit in which the circuit connected between the power source Vin and the output voltage Vout in FIG. 3 or FIG. 6 are connected in parallel.

Figure 8:
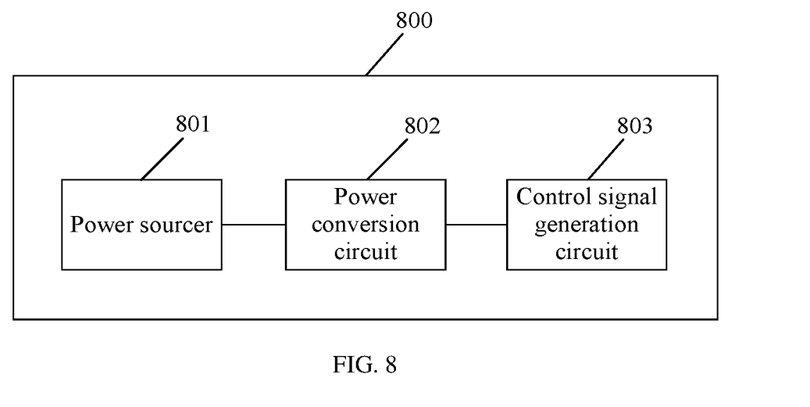
FIG. 8 is a schematic structural diagram of a conversion apparatus having a power conversion circuit.

Refer to FIG. 8. FIG. 8 shows a conversion apparatus 800 according to an embodiment of this application, including a power source 801, a power conversion circuit 802, and a control signal generation circuit 803. The power source 801 provides low voltage working power to a load through the power conversion circuit 802. The control signal generation circuit 803 is configured to provide a periodic control signal to the power conversion circuit 802, where the control signal is used to control a switch in the power conversion circuit 802 to be closed or open. The power conversion circuit 802 may be the power conversion circuit described in any one of the foregoing embodiments. The power conversion circuit may be an electronic device such as a charger.

Because the conversion apparatus uses the foregoing power conversion circuit, power conversion efficiency of the conversion circuit shown in FIG. 8 is improved correspondingly. For brevity of description, details are not described herein again.

Refer to FIG. 2. FIG. 2 shows a terminal device 200 according to an embodiment of this application, including a power source 201, a power conversion circuit 202, a load 203, and a control signal generation circuit 204. The power source 201 provides low voltage working power to the load 203 through the power conversion circuit 202. The control signal generation circuit 204 is configured to provide a periodic control signal to the power conversion circuit 202, where the control signal is used to control a switch in the power conversion circuit 202 to be closed or open. The terminal device may be a battery, a cell phone, an electric vehicle, or the like.

Because the terminal device uses the foregoing power conversion circuit, power conversion efficiency of the terminal device shown in FIG. 2 is improved correspondingly. For brevity of description, details are not described herein again.

When the power conversion circuit included in this embodiment of this application becomes steady, a current in the filter inductor is reduced relative to a current in a filter inductor in a traditional power conversion circuit, and correspondingly, a direct current resistance loss corresponding to the filter inductor is reduced. In addition, a voltage amplitude at a junction of the first capacitor and the filter inductor is reduced relative to a voltage amplitude at the junction in the traditional power conversion circuit. Therefore, an energy loss corresponding to parasitic capacitance at the junction is reduced. Therefore, the conversion efficiency of the power conversion circuit described in this embodiment is improved. It is understood that conversion efficiency of a conversion apparatus or a terminal device that uses the power conversion circuit is improved correspondingly.

In the specification and claims of this application, the terms "first", "second", "third", "fourth" and the like are intended to distinguish between different objects rather than indicate a particular order. In addition, the terms "include", "have", or any other variants thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

In the foregoing embodiments, the description of each embodiment has a respective focus. For what is not described in detail in one embodiment, refer to related descriptions in other embodiments.

Evidently, a person skilled in the art can make various modifications and variations to this application without departing from the spirit and scope of this application. As such, if these modifications and variations to this application fall in the scope of the claims of this application and equivalent technologies thereof, this application also includes these modifications and variations.

What is claimed is:

1. A power conversion circuit, comprising:
    a first switch branch comprising a first switch;
    a second switch branch comprising a second switch, wherein the second switch branch is coupled to the first switch branch;
    a third switch branch comprising a third switch, wherein the third switch branch is coupled to the first switch branch and the second switch branch;
    a filter branch comprising:
        a first inductor comprising a first terminal and a second terminal; and
        a filter capacitor comprising a third terminal and a fourth terminal;
    a first capacitor comprising:
        a fifth terminal coupled to a power source through the first switch branch; and
        a sixth terminal coupled to ground through the second switch branch, wherein the first inductor is coupled in series to the filter capacitor, wherein the first terminal is coupled to the fifth terminal, wherein the second terminal is coupled to the third terminal, wherein the fourth terminal is grounded, and wherein the third switch branch is coupled between the second terminal and the sixth terminal; and
    a load coupled to filter branch, wherein the filter capacitor is coupled in parallel with the load; and
    wherein the second switch branch comprises i switching circuits, wherein the second switch comprises a seventh terminal and an eighth terminal, wherein the eighth terminal is connected to the sixth terminal, wherein the eighth terminal is grounded through the i switching circuits, wherein i is an integer, and wherein i>1.

2. The power conversion circuit of claim 1, further comprising a fourth switch branch coupled in parallel with the first capacitor, wherein the fourth switch branch comprises a fourth switch.

3. The power conversion circuit of claim 2, wherein the fourth switch is a metal-oxide-semiconductor (MOS) transistor or a bipolar junction transistor (BJT).

4. The power conversion circuit of claim 1, wherein any of the i switching circuits comprises:
    a $(j+1)^{th}$ capacitor;
    a $(3\times(j+1))^{th}$ switch branch;
    a $(3\times(j+1)-1)^{th}$ switch branch;
    a $(3\times(j+1)-2)^{th}$ switch branch, wherein j is an integer, and wherein $1 \le j \le i$; and
    an $i^{th}$ switching circuit comprising an $(i+1)^{th}$ capacitor, wherein the $(i+1)^{th}$ capacitor comprises a $(i+1)^{th}$ capacitor first terminal and a $(i+1)^{th}$ capacitor second terminal, wherein the $(i+1)^{th}$ capacitor first terminal is coupled to the power source through a $(3\times(i+1)-2)^{th}$ switch branch, and wherein the $(i+1)^{th}$ capacitor second terminal is grounded through a $(3\times(i+1)-1)^{th}$ switch branch, and wherein the $(i+1)^{th}$ capacitor second terminal is coupled to the second terminal through a $(3\times(i+1))^{th}$ switch branch;
    wherein the $(i+1)^{th}$ capacitor is a second capacitor when i=1, wherein the second switch is coupled between a second capacitor first terminal and the sixth terminal, wherein the second capacitor comprises the second capacitor first terminal;
    wherein a $(k+1)^{th}$ capacitor first terminal in a $k^{th}$ switching circuit is coupled to the power source through a $(3\times(k+1)-2)^{th}$ switch branch, wherein a $(3\times(k+1)-1)^{th}$ switch branch is coupled between a $(k+2)^{th}$ capacitor first terminal and a $(k+1)^{th}$ capacitor second terminal, wherein the $(k+1)^{th}$ capacitor second terminal is coupled to the second terminal through a $(3\times(k+1))^{th}$ switch branch, wherein k is an integer, and wherein $1 \le k < i$.

5. The power conversion circuit of claim 4, further comprising a fifth switch branch coupled between the fifth terminal and the $(i+1)^{th}$ capacitor second terminal, wherein the fifth switch branch comprises a fifth switch.

6. The power conversion circuit of claim 5, wherein the fifth switch is a metal oxide semiconductor (MOS) transistor or a bipolar junction transistor (BJT).

7. A conversion apparatus, comprising:
a power conversion circuit;
a power source coupled to the power conversion circuit, wherein the power source provides low voltage working power through the power conversion circuit;
a control signal generation circuit coupled to the power conversion circuit, wherein the control signal generation circuit is configured to provide a periodic control signal to the power conversion circuit, wherein the periodic control signal controls a switch in the power conversion circuit to be closed or open, and wherein the power conversion circuit comprises:
a first switch branch comprising a first switch;
a second switch branch comprising a second switch, wherein the second switch branch is coupled to the first switch branch;
a third switch branch comprises a third switch, wherein the third switch branch is coupled to the first switch branch and the second switch branch;
a filter branch comprising:
a first inductor comprising a first terminal and a second terminal; and
a filter capacitor comprising a third terminal and a fourth terminal;
a first capacitor comprising:
a fifth terminal coupled to the power source through the first switch branch; and
a sixth terminal coupled to ground through the second switch branch, wherein the first inductor is coupled in series to the filter capacitor, wherein the first terminal is coupled to the fifth terminal, wherein the second terminal is coupled to the third terminal, wherein the fourth terminal is grounded, and wherein the third switch branch is coupled between the second terminal and the sixth terminal; and
a load coupled to the filter branch of the power conversion circuit and configured to receive the low voltage working power from the power conversion circuit, wherein the filter capacitor is coupled in parallel with the load; and
wherein the second switch branch comprises i switching circuits, wherein the second switch comprises a seventh terminal and an eighth terminal, wherein the eighth terminal is connected to the sixth terminal, wherein the eighth terminal is grounded through the i switching circuits, wherein i is an integer, and wherein i>1.

8. The conversion apparatus of claim 7, further comprising a fourth switch branch coupled in parallel with the first capacitor, wherein the fourth switch branch comprises a fourth switch.

9. The conversion apparatus of claim 8, wherein the fourth switch is a metal oxide semiconductor (MOS) transistor or a bipolar junction transistor (BJT).

10. The conversion apparatus of claim 7, wherein any of the i switching circuits comprises:
a $(j+1)^{th}$ capacitor;
a $(3\times(j+1))^{th}$ switch branch;
a $(3\times(j+1)-1)^{th}$ switch branch; and
a $(3\times(j+1)-2)^{th}$ switch branch, wherein j is an integer, and wherein $1\leq j\leq i$; and
an $i^{th}$ switching circuit comprising an $(i+1)^{th}$ capacitor, wherein the the $(i+1)^{th}$ capacitor comprises a $(i+1)^{th}$ capacitor first terminal and a $(i+1)^{th}$ capacitor second terminal, wherein the $(i+1)^{th}$ capacitor first terminal is coupled to the power source through a $(3\times(i+1)-2)^{th}$ switch branch, wherein the $(i+1)^{th}$ capacitor second terminal is grounded through a $(3\times(i+1)-1)^{th}$ switch branch, and wherein the $(i+1)^{th}$ capacitor second terminal is coupled to the second terminal through a $(3\times(i+1))^{th}$ switch branch,
wherein the $(i+1)^{th}$ capacitor is a second capacitor when i=1, wherein the second switch is coupled between a second capacitor first terminal and the first capacitor second terminal, wherein the second capacitor comprises the second capacitor first terminal,
wherein a $(k+1)^{th}$ capacitor first terminal in a $k^{th}$ switching circuit is coupled to the power source through a $(3\times(k+1)-2)^{th}$ switch branch, wherein a $(3\times(k+1)-1)^{th}$ switch branch is coupled between a $(k+2)^{th}$ capacitor first terminal and a $(k+1)^{th}$ capacitor second terminal, wherein the $(k+1)^{th}$ capacitor second terminal is coupled to the second terminal through a $(3\times(k+1))^{th}$ switch branch, wherein k is an integer, and wherein $1\leq k<i$.

11. The conversion apparatus of claim 10, further comprising a fifth switch branch coupled between the fifth terminal and the $(i+1)^{th}$ capacitor second terminal, wherein the fifth switch branch comprises a fifth switch.

12. The conversion apparatus of claim 11, wherein the fifth switch is a metal-oxide-semiconductor (MOS) transistor or a bipolar junction transistor (BJT).

13. A terminal device, comprising:
a power conversion circuit;
a power source coupled to the power conversion circuit, wherein the power source provides low voltage working power through the power conversion circuit;
a control signal generation circuit coupled to the power conversion circuit, wherein the control signal generation circuit is configured to provide a periodic control signal to the power conversion circuit, wherein the periodic control signal controls a switch in the power conversion circuit to be closed or open, and wherein the power conversion circuit comprises:
a first switch branch comprising a first switch;
a second switch branch comprising a second switch, wherein the second switch branch is coupled to the first switch branch;
a third switch branch comprises a third switch, wherein the third switch branch is coupled to the first switch branch and the second switch branch;
a filter branch comprising:
a first inductor comprising a first terminal and a second terminal; and
a filter capacitor comprising a third terminal and a fourth terminal;
a first capacitor comprising:
a fifth terminal coupled to the power source through the first switch branch; and
a sixth terminal coupled to ground through the second switch branch, wherein the first inductor is coupled in series to the filter capacitor, wherein the first terminal is coupled to the fifth terminal, wherein the second terminal is coupled to the third terminal, wherein the fourth terminal is grounded, and wherein the third switch branch is coupled between the second terminal and the sixth terminal; and
a load coupled to the filter branch of the power conversion circuit and configured to receive the low voltage working power from the power conversion circuit, wherein the filter capacitor is coupled in parallel with the load; and wherein the second switch branch comprises i switching circuits, wherein the second switch comprises a seventh terminal and an eighth terminal, wherein the eighth terminal is connected to the sixth terminal, wherein the eighth terminal is grounded through the i switching circuits, wherein i is an integer, and wherein i>1.

14. The terminal device of claim 13, further comprising a fourth switch branch coupled in parallel with the first capacitor, wherein the fourth switch branch comprises a fourth switch.

15. The terminal device of claim 14, wherein the fourth switch is a metal-oxide-semiconductor (MOS) transistor or a bipolar junction transistor (BJT).

* * * * *

UNITED STATES PATENT AND TRADEMARK OFFICE
CERTIFICATE OF CORRECTION

PATENT NO. : 11,362,588 B2
APPLICATION NO. : 16/697992
DATED : June 14, 2022
INVENTOR(S) : Song et al.

Page 1 of 1

It is certified that error appears in the above-identified patent and that said Letters Patent is hereby corrected as shown below:

In the Claims

Claim 4, Column 10, Line 35: "a(j+1)" should read "a (j+1)"

Claim 7, Column 11, Line 50: "wherein i>1." should read "wherein i≥1."

Claim 13, Column 13, Line 9: "wherein i>1." should read "wherein i≥1."

Signed and Sealed this
Twenty-sixth Day of July, 2022

Katherine Kelly Vidal
*Director of the United States Patent and Trademark Office*